July 25, 1939.  W. F. GROTE  2,167,149
TOTAL REFLECTING PRISM SHEET
Filed Aug. 20, 1937
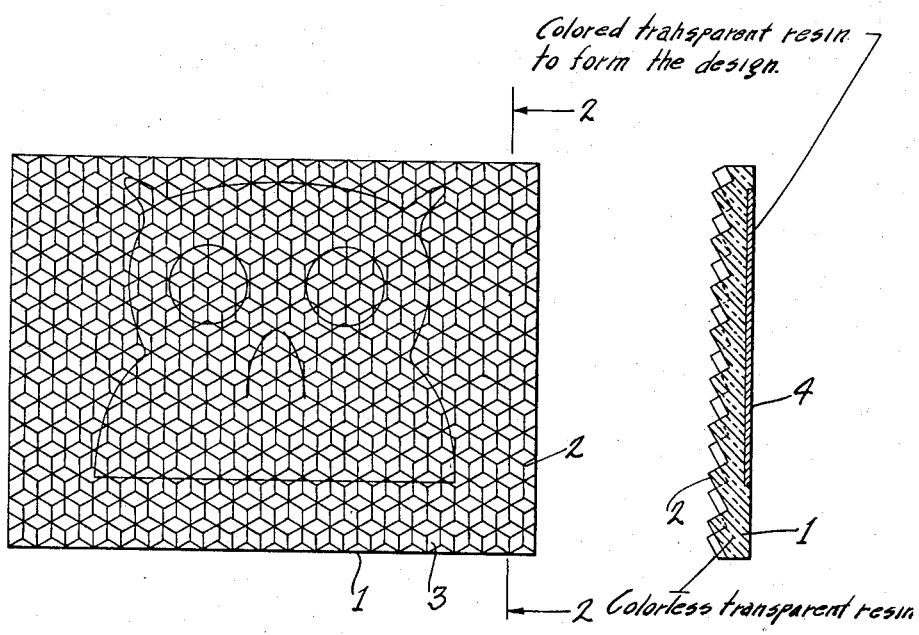
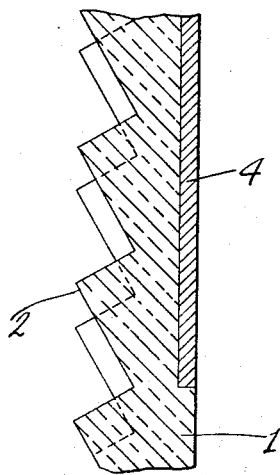
INVENTOR.
WALTER F. GROTE
BY
ATTORNEY.

Patented July 25, 1939

2,167,149

UNITED STATES PATENT OFFICE 2,167,149

TOTAL REFLECTING PRISM SHEET

Walter F. Grote, Mount Washington, Ohio, assignor to The National Colortype Company, Bellevue, Ky., a corporation of Kentucky Application August 20, 1937, Serial No. 160,125

1 Claim. (Cl. 40—135)

This invention relates to a means and method of producing a light reflecting design adapted to be illuminated by a source of light remote from the face of the design and illuminated by a source of light behind the design.

It is an object to provide a cube corner prism sheet on the face of which is a colored transparent medium to form a design so that light from in front of the sheet will pass through the design and be reflected back by the prisms.

It is an object to so arrange the sheet that it is not entirely covered by the design so that light may be transmitted to the sheet from the opposite side from which the light is directed for reflecting purposes.

It is an object of this invention to provide an integral sheet of cube corner prisms arranged in contiguous relationship in which are formed designs of a variety of configurations and colors, the material surrounding the design being either transparent, translucent or opaque.

It is an object of this invention to provide a cube corner prism sheet of plastic material such as glass or synthetic resins and the like that may be either colorless or of some transparent color.

It is an object to provide such a product by placing a design formed of synthetic resin material, a reflecting medium or other material in a mold into which mold there is injected plastic material such as synthetic resin so that the pressure thereon will form a cube corner prism sheet in which the design becomes an integral part because it fuses thereto or adheres therewith.

It is an object of this invention to simultaneously form a cube corner prism sheet and incorporating therewith an insert either of the same material of different color or of different materials or light-reflecting materials. If light-reflecting materials or different colored materials are employed, it is an object to use either colored transparent synthetic resin or anodically treated aluminum sheets or any other form of light-reflecting or colored materials so as to bring out a distinctive design in the transparent resin of the main sheet.

It is a further object to provide a product in which the cube corner prisms will reflect light incident thereto back to the source and substantially parallel to the incident light so that this reflecting light will be colored to correspond with the colors of the design and background of the prismatic plate. Additionally thereto there may be provided a source of illumination behind the plate in certain areas to bring out light and color contrasts.

Referring to the drawing,

Figure 1 is a front elevation of a cube prism plate with a design incorporated therewith.

Figure 2 is a section on the line 2—2 of Figure 1.

Figure 3 is an enlargement of the section shown in Figure 2, showing the cube prism faces 2 with the color design formed integral therewith as at 4.

Referring to the drawing in detail, 1 is a main body of colored or colorless transparent synthetic resin which has been molded with its face formed into a plurality of cube corners 2 providing light reflecting surfaces 3. Into the back of this resin body 1 has been integrally incorporated a design sheet of colored transparent resin designated 4. As heretofore pointed out this may be of any desired material or may be light reflecting as in the case of a piece of colored foil which has been incorporated and adheres to the resin. Preferably this is formed of colored transparent resin to form the design.

The prismatic structure 2 is the rear of the device and the front is indicated at 4. The light comes through from the front 4, strikes the prisms 2, and is by total reflection returned back through the front 4 substantially parallel to the entering light.

The design 4 may be made transparent, or even, in some cases, translucent or opaque. In such latter event, the reflected light around the design will outline it and act as a frame. If the apertures in the design, such as the eyes of the owl, are open, then the light will be reflected back through the eyes of the owl and around the design of the owl, giving an impression of an animated figure or design.

By suitably adjusting the character of the design, the colors thereof and the position thereof, varied effects can be secured as the incident light moves across the sheet. If desired a source of illumination may be provided behind the sheet for illuminating the material around the design in the event that the design is opaque. The cube corner prisms reflect light incident thereto and due to the angularity of the prisms as the source of incident light passes across or changes its angle or position with respect to the face of the tube prism sheet the sheet appears, with its design, brilliantly illuminated in different colors and with an animation that is not found in the ordinary light reflecting surface.

It will be understood that it is desired to comprehend within this invention such modifications as come within the scope of the claim and the invention.

Having thus fully described my invention what I claim as new and desire to secure by Letters Patent is:

A new article of manufacture comprising a reflector having a cube prism sheet providing light reflecting surfaces and formed on one face, and a colored design sheet comprising light reflecting metal integral with the opposite face and covering at least a part of said face whereby light directed onto said reflector will be reflected so as to bring out the color of the design and outline it to produce a distinctive configuration.

WALTER F. GROTE.